(12) United States Patent  
Park et al.

(10) Patent No.: US 9,275,443 B2
(45) Date of Patent: Mar. 1, 2016

(54) IMAGE-PROCESSING APPARATUS FOR REMOVING HAZE CONTAINED IN VIDEO, AND METHOD THEREFOF

(71) Applicants: SK TELECOM CO., LTD., Seoul (KR); KOREA UNIVERSITY RESEARCH AND BUSINESS FOUNDATION, Seoul (KR)

(72) Inventors: Yongsup Park, Seoul (KR); Donghahk Lee, Seoul (KR); Changsu Kim, Seoul (KR); Jinhwan Kim, Goyang-si (KR); Wondong Jang, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/542,992

(22) Filed: Nov. 17, 2014

(65) Prior Publication Data

US 2015/0071563 A1 Mar. 12, 2015

(30) Foreign Application Priority Data

May 15, 2012 (KR) .......................... 10-2012-0051330

(51) Int. Cl.
*G06T 5/00* (2006.01)
*G06T 7/40* (2006.01)

(52) U.S. Cl.
CPC ................. *G06T 5/007* (2013.01); *G06T 7/408* (2013.01); *G06T 2207/10016* (2013.01); *G06T 2207/10024* (2013.01); *G06T 2207/20012* (2013.01)

(58) Field of Classification Search
USPC .................................................. 382/274, 254
See application file for complete search history.

(56) References Cited

U.S. PATENT DOCUMENTS

| 8,249,303 | B2* | 8/2012 | Nitanda | ................. G06T 5/002 382/104 |
| 8,340,461 | B2* | 12/2012 | Sun | ......................... G06K 9/40 358/3.26 |
| 8,417,053 | B2* | 4/2013 | Chen | ...................... G06T 5/003 382/167 |
| 8,582,915 | B2* | 11/2013 | Wen | ...................... H04N 19/51 382/261 |
| 8,885,962 | B1* | 11/2014 | Mudge | ..................... G01J 4/04 382/254 |
| 2011/0135200 | A1* | 6/2011 | Chen | ...................... G06T 5/003 382/167 |
| 2012/0213436 | A1* | 8/2012 | Grindstaff | ............... G06T 5/008 382/167 |

FOREIGN PATENT DOCUMENTS

| JP | 2012027547 A | 2/2012 |
| KR | 100829581 B1 | 5/2008 |
| KR | 1020090097005 A | 9/2009 |
| KR | 1020100021952 A | 2/2010 |
| KR | 1020110119989 A | 11/2011 |

OTHER PUBLICATIONS

International Search Report for PCT/KR2013/003859 dated Sep. 12, 2013.

* cited by examiner

*Primary Examiner* — Ishrat I Sherali
(74) *Attorney, Agent, or Firm* — Hauptman Ham, LLP

(57) ABSTRACT

An image processing apparatus includes a haze brightness measurer to measure haze brightness in an image containing haze, a transmission estimator to estimate a blockwise transmission for generating a least final cost function value that is calculated by using a contrast, an image loss and a time loss of the image and to estimate a pixelwise transmission based on the estimated blockwise transmission, and an image reconstructor to reconstruct the image by using the measured haze brightness and the estimated pixelwise transmission.

20 Claims, 12 Drawing Sheets

(a) Input Image  (b) Blockwise Transmission (c) Blockwise Edge Filtered  (d) Gaussian Weighted

IMAGE-PROCESSING APPARATUS FOR REMOVING HAZE CONTAINED IN VIDEO, AND METHOD THEREFOF

CROSS-REFERENCE TO RELATED APPLICATION

The instant application is a continuation of PCT/KR2013/003859, filed May 3, 2013, which is based on and claims priority to Korean Patent Application No. 10-2012-0051330, filed on May 15, 2012. The disclosures of above-listed applications are hereby incorporated by reference herein in their entirety.

TECHNICAL FIELD

The present disclosure in one or more embodiments relates to an image processing apparatus and method for removing haze contained in a video.

BACKGROUND

The statements in this section merely provide background information related to the present disclosure and do not constitute prior art.

Haze is an atmospheric phenomenon of water vapor floating in the form of condensed droplets. Hazy environment typically causes an obstruction to vision of less than 1 km of visibility. Such foggy weather causes particulate water droplets and in turn scattering of light. The scattering of light represents directional changes of traveling light as it collides with airborne particles. The scattering depends on the wavelength of light and the particle size.

Light scattering is generally divided into Rayleigh scattering and Mie scattering. The Rayleigh scattering applies when the size of the particles that cause the scattering is smaller than the wavelength of light where the scattering energy is inversely proportional to the fourth power of the wavelength. This is exemplified by blue hue of the sky in a sunny day when air molecules scatter the light by scattering more blue than red. However, the Mie scattering theory applies to the light scattering when the size of the responsible particles is greater than the wavelength of light. Haze follows the Mie scattering theory since the particles of haze have the diameter as large as a few μm to a few tens of μm over the wavelength of 400 nm~700 nm of visible light. According to the Mie scattering theory, with larger scattering particles like water droplets in the atmosphere, the amount of scattering is less influenced by the wavelength to cause near-even scattering of all the light in the visible light zone. Thus, when the condition is hazy, objects exhibit a blurred image. At this time, a new light source called airlight is generated.

The inventor(s) has noted that image quality improvement through correction of the haze distortion resolve the visibility obstruction and sharpen fuzzy images. In addition, the inventor(s) has noted that such image improvement is important as a pre-processing step for recognition of the objects by restoring damaged information on letters, objects, and the like due to the haze.

Known dehazing technologies are roughly categorized into a non-model approach and a model approach.

An example of the non-model approach includes histogram equalization. The histogram equalization is a method for analyzing a histogram of an image to adjust distribution. The inventor(s) has experienced that The histogram equalization is easy and provides an improved effect but is not proper for a hazy image having a non-uniform depth. In addition, the inventor(s) has experienced that the histogram equalization is proper for improving general image quality but does not satisfactorily reflect characteristics of an influence that haze has on an image. The inventor(s) has experienced that for an image containing thick haze, it provides an insignificant improvement.

The model approach is for modeling an influence that a scattering phenomenon of light due to haze has on an image. The inventor(s) has noted that first, a technology has been disclosed for comparing two or more images obtained in different weathers to estimate and correct a scene depth, thereby correcting distortion due to haze. However, the inventor(s) has experienced that in this technology, input of at least two images under different weathers is required. For a real-time implementation, therefore, The inventor(s) has experienced that it is necessary to monitor weather changes and provide a commensurate image storage space thereto. In addition, the inventor(s) has experienced that it is difficult to determine a storage period since a weather change cycle cannot be estimated. Furthermore, the inventor(s) has noted that it is necessary to capture the same scene having no error. Therefore, the inventor(s) has noted that a moving object frequently causes an error during estimation of the degree of haze distortion.

Next, the inventor(s) has noted that there is a known technology for correcting distortion due to haze by estimating and subtracting the amount of change of pixel values of an image due to the haze. The inventor(s) has noted that this technology is based on the assumption that the haze is uniform, which is only applicable to uniform and thin haze. However, the inventor(s) has noted that most real world haze tends to be non-uniform. The inventor(s) has experienced that even to uniform haze, this method has disadvantage because the degree of the haze influence depends on the distance between a camera and an object.

SUMMARY

In accordance with some embodiments of the present disclosure, an image processing apparatus for removing haze contained in a video comprises a haze brightness measurer, a transmission estimator and an image reconstructor. The haze brightness measurer is configured to measure haze brightness in an image containing haze. The transmission estimator is configured to estimate a blockwise transmission for generating a least final cost function value that is calculated by using a contrast, an image loss and a time loss of the image and to estimate a pixelwise transmission based on the estimated blockwise transmission. And the image reconstructor is configured to reconstruct the image by using the measured haze brightness and the estimated pixelwise transmission.

In accordance with some embodiments of the present disclosure, an image processing apparatus is configured to measure haze brightness in an image containing haze, estimate a blockwise transmission for generating a least final cost function value that is calculated by using a contrast, an image loss and a time loss of the image and estimating a pixelwise transmission based on the estimated blockwise transmission; and reconstruct the image by using the measured haze brightness and the estimated pixelwise transmission.

DETAILED DESCRIPTION

Figure 1:
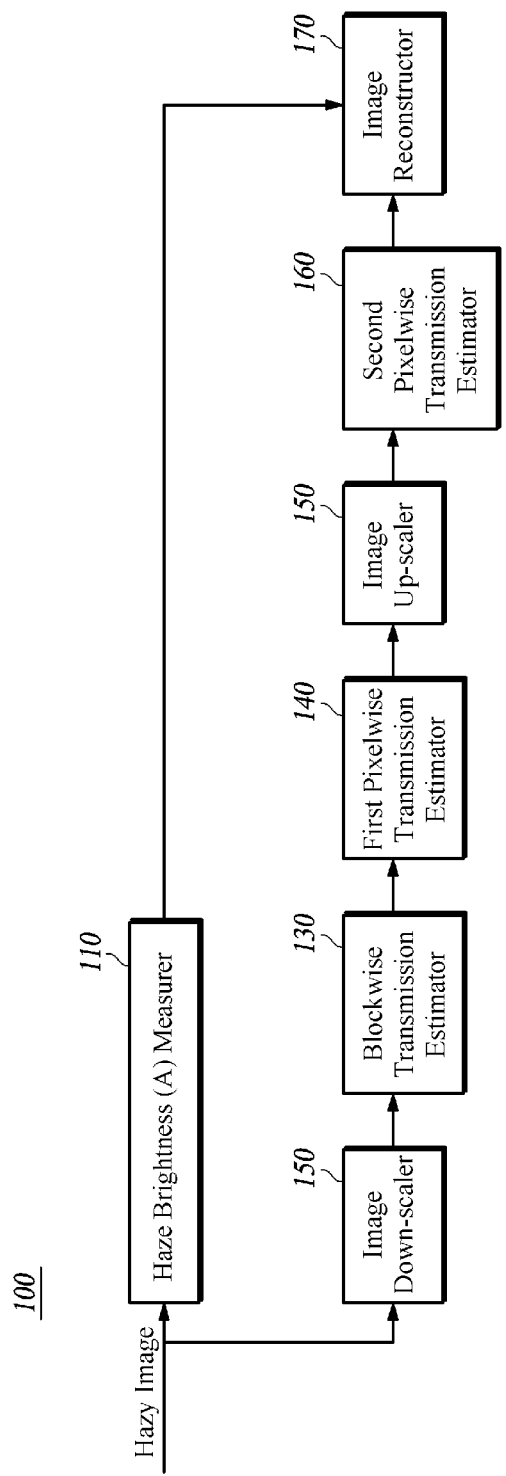
FIG. 1 is a block diagram of a configuration of an image processing apparatus for removing haze contained in a video according to at least one embodiment of the present disclosure.

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Some embodiments of the present disclosure provide an image processing apparatus and method for removing haze contained in a video to be able to effectively estimate and remove a haze component from a video, thereby improving image quality. In addition, some embodiments of the present disclosure provide an image processing apparatus and method for removing haze contained in a video to be able to differentially improve a contrast based on depth information of an image.

In the present disclosure, haze is, for example, atmospheric mist or fog for convenience of description only. Alternatively, the haze can be defined as, for example, yellow sand, dust, or airborne matters (or any kinds of matter(s) or particle(s) to cause scattering a direction of a light travel) similar to the mist or the fog.

An image processing apparatus reconstructs an image containing haze by using Equation 1.

$$I_p = J_p t_p + (1-t_p) \cdot A \quad \text{Equation 1}$$

Here, $I_p$ is a brightness value of an obtained image (image influenced by haze) at pixel position p, $J_p$ is the original brightness value of the obtained image (image not influenced by haze) at pixel position p, $t_p$ is a transmission (which indicates a concentration rate of the haze that is transmitted to pixel p from a pixel selected as haze brightness), and A is a haze brightness value.

The image processing apparatus generates cost functions based on a cost $E_C$ taking account of a contrast, an image loss $E_L$ which may be incurred when improving the contrast, and cost $E_T$ taking account of temporal similarity in a video, calculates a transmission 't' by which the least cost function is generated, and reconstructs an image containing haze by using Equation 1.

Hereinafter, reconstruction of a video containing haze, performed by the image processing apparatus using Equation 1 will be described with reference to the drawings.

Figure 2:
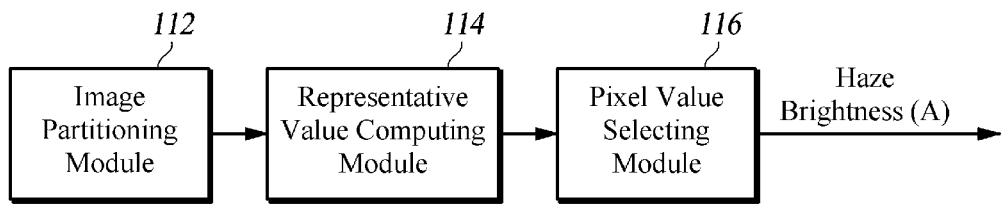
FIG. 2 is a block diagram of a detailed configuration of a haze brightness measurer shown in FIG. 1.
Figure 3:
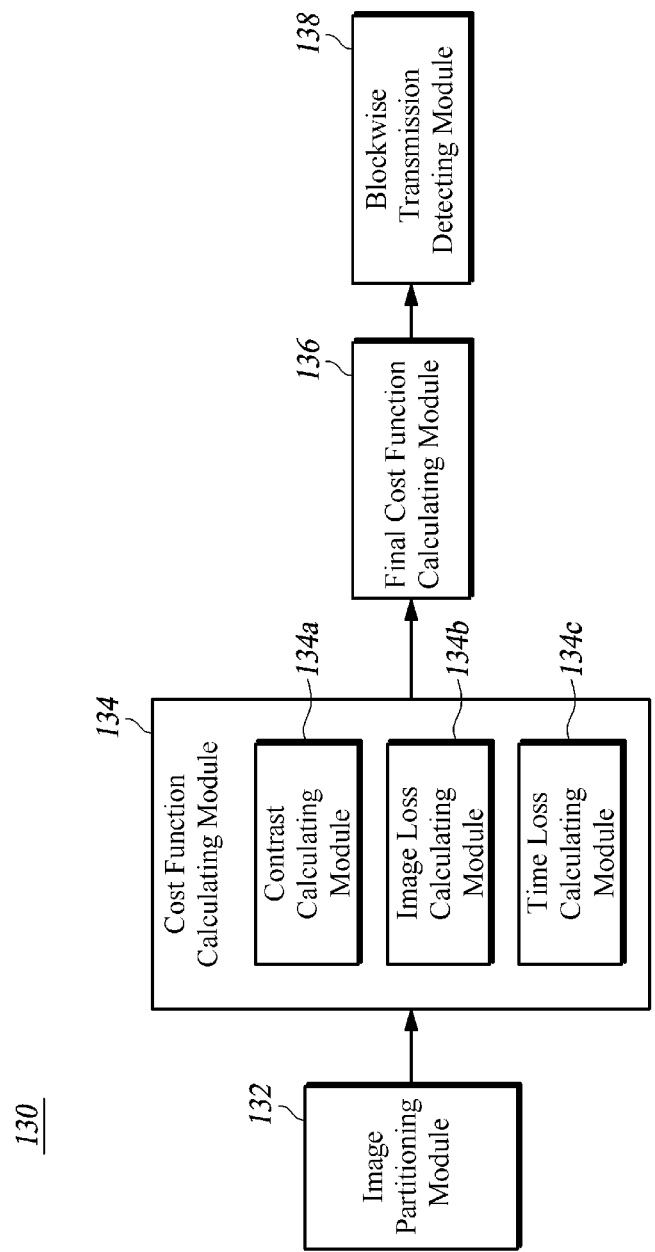
FIG. 3 is a block diagram of a detailed configuration of a blockwise transmission estimator shown in FIG. 1.
Figure 4:
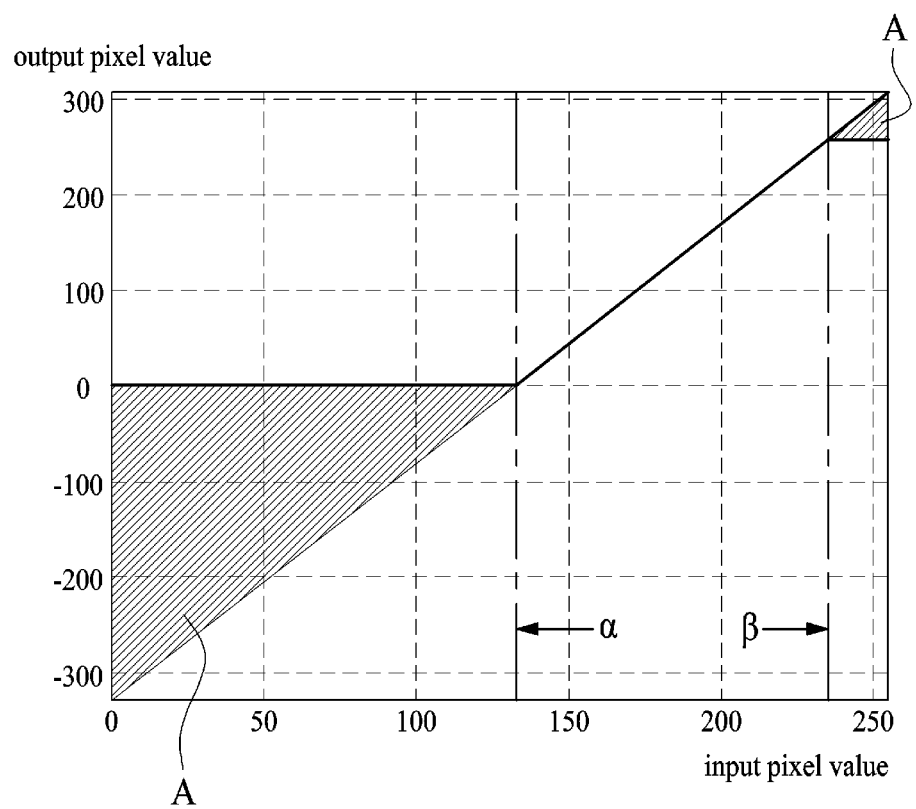
FIG. 4 is a diagram for illustrating a concept of image loss minimization.
Figure 5:
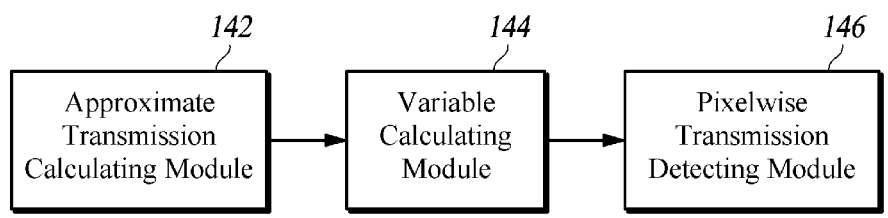
FIG. 5 is a block diagram of a detailed configuration of a pixelwise transmission estimator shown in FIG. 1.
Figure 6:
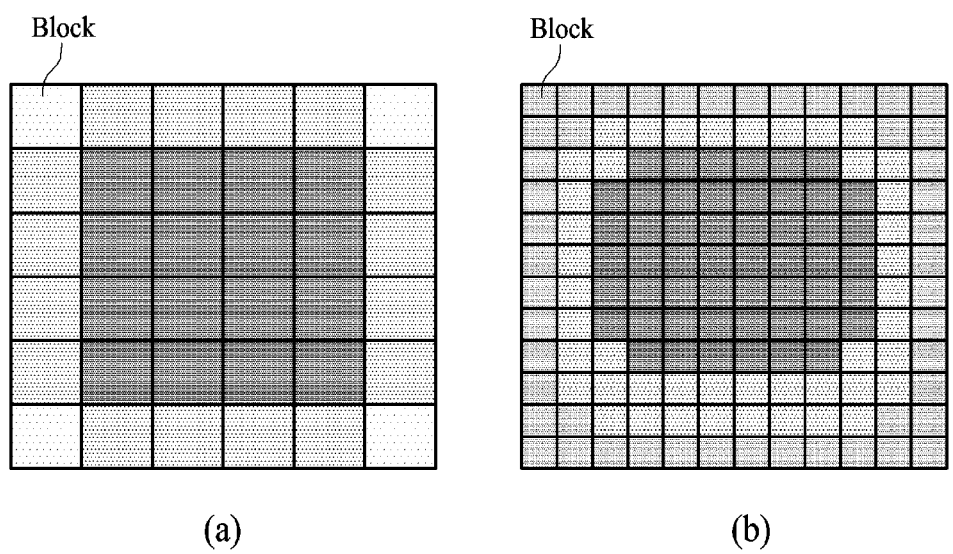
FIG. 6 is a diagram for illustrating a block overlapping according to at least one embodiment of the present disclosure.
Figure 7:
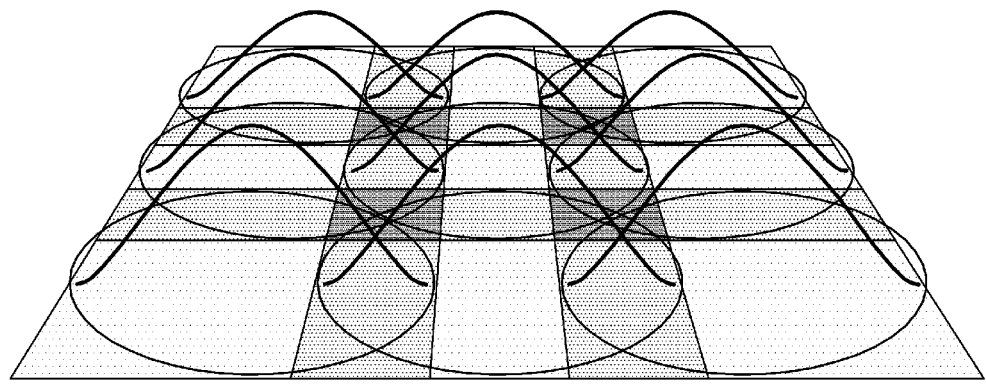
FIG. 7 is a diagram for illustrating an overlapping by using a Gaussian weight according to at least one embodiment of the present disclosure.

FIG. 1 is a block diagram of a configuration of an image processing apparatus for removing haze contained in a video according to at least one embodiment of the present disclosure. FIG. 2 is a block diagram of a detailed configuration of a haze brightness measurer shown in FIG. 1. FIG. 3 is a block diagram of a detailed configuration of a blockwise transmission estimator shown in FIG. 1. FIG. 4 is a diagram for illustrating a concept of image loss minimization according to at least one embodiment of the present disclosure. FIG. 5 is a block diagram of a detailed configuration of a pixelwise transmission estimator shown in FIG. 1. FIG. 6 is a diagram for illustrating a block overlapping according to at least one embodiment of the present disclosure. FIG. 7 is a diagram for illustrating an overlapping by using a Gaussian weight according to at least one embodiment of the present disclosure.

Referring to FIG. 1, an image processing apparatus 100 for removing haze contained in a video includes a haze brightness measurer 110, an image down-scaler 120, a blockwise transmission estimator 130, a first pixelwise transmission estimator 140, an image up-scaler 150, a second pixelwise transmission estimator 160 and an image reconstructor 170. All or some components of the image processing apparatus 100, such as the haze brightness measurer 110, the image down-scaler 120, the blockwise transmission estimator 130, the first pixelwise transmission estimator 140, the image up-scaler 150, the second pixelwise transmission estimator 160 and the image reconstructor 170 are implemented by one or more processors and/or application-specific integrated circuits (ASICs).

The haze brightness measurer 110 partitions an image containing haze into a predetermined number of blocks to obtain a representative value for each block, selects the block having the largest one of the obtained representative values, and repeats to partition the selected block into the predetermined number of blocks until the area of the selected block gets equal to or less than a preset area and to obtain a representative value and thereby obtains haze brightness. The image containing the haze may be a video.

In order to obtain the haze brightness, it is assumed for convenience of description that 'haze is atmospheric light arrived from the sun and thus has a very high brightness value' and that 'a pixel value influenced by haze approximates the haze brightness.' In addition, referring to Equation 1, it can be seen that an obtained image is influenced by haze in proportion to the transmission (depth information and distance between an image and an object). Therefore, since most values of a region greatly influenced by the haze are distributed around the haze value, a standard deviation is reduced.

When combining the above two assumptions, it can be seen that the haze brightness value has a very high brightness value in the image and can be obtained from the region most greatly influenced by the haze. The haze may be selected by the brightest pixel value, when a white object may be selected, which leads to a problem. As a solution, blocks are gradually reduced to smaller sizes which are then detected, in order to narrow down the candidate haze brightness values to the minimum (a block with preset area) wherein most of the component pixel values can be seen as influenced by the haze brightness value and then the brightest pixel value can be selected as the haze brightness value with little concern for probable errors. Consequently, the haze brightness measurer 110 selects the brightest pixel value as the haze brightness value.

Referring to FIG. 2, the haze brightness measurer 110 includes an image partitioning module 112, a representative value computing module 114 and a pixel value selecting module 116. All or some components of the haze brightness measurer 110, such as the image partitioning module 112, the representative value computing module 114 and the pixel value selecting module 116 are implemented by one or more processors and/or application-specific integrated circuits (ASICs).

The image partitioning module 112 partitions an image containing haze into a predetermined number of blocks. The predetermined number of blocks are, for example, four.

To obtain a representative value for each block, the image partitioning module 112 uses the average brightness and standard deviation of pixel values in each block both of which may differ depending upon the size of each block. For example, to obtain a representative value by using a block having size 20×20, a representative value is selected to be high at the presence of a bright object, such as a white building or white vehicle in a hazeless region. Increasing the size of the block will render the representative value to be selected from a more hazy side while making the haze brightness value difficult to find in the block. For this reason, by partitioning an image into blocks, blocks are gradually reduced to smaller sizes to narrow down the candidate haze brightness values. At this time, for processing a video, the haze brightness value is detected at the first frame or every T frame to prevent a specularity due to renewal of the haze brightness value.

The representative value computing module 114 obtains the average and standard deviation of pixel values for each of the blocks partitioned by the image partitioning module 112 and obtains a representative value by using differences in the averages and standard deviations among the respective blocks.

The haze brightness value has a very high brightness value in the image and can be obtained from the region that is most affected by the haze. Since most values of the region greatly influenced by the haze are distributed around the haze value, the standard deviation is reduced. In order to obtain the haze brightness value, therefore, the representative value computing module 114 calculates a representative value by using the average and standard deviation of each block.

The pixel value selecting module 116 selects the block having the largest representative value from those obtained for the respective blocks and, when the area of the selected block is equal to or less than a preset area, selects the brightest pixel value of the block as the haze brightness.

As aforementioned, by the time the candidate haze brightness values are narrowed down to a final value (a block with preset area), most of the pixel values in the block can be seen as influenced by the haze brightness value, which leaves little concern for probable errors even when selecting the brightest pixel value as the haze brightness value. Accordingly, when the block area gets equal to the preset area or smaller, the pixel value selecting module 116 selects the brightest pixel value as the haze brightness value.

The pixel value selecting module 116 selects the block having the largest representative value and determines whether the area of the selected block is equal to or less than the preset area. The preset area of the block is length by width of the block, which may be, for example, 200. Upon determining that the area of the selected block becomes equal to or less than 200, the pixel value selecting module 116 selects the brightest pixel value of the selected block and estimates the selected pixel value as the haze brightness.

Upon determining that the area of the selected block is greater than 200, the pixel value selecting module 116 partitions the selected block into a predetermined number of smaller blocks to obtain a representative value for each block, selects one of the blocks having the largest representative value, and determines whether the area of the selected block is equal to or less than the preset area, which are repeated. When this process selects a block having an area equal to or less than the preset area, the pixel value selecting module 116 estimates the brightest pixel value of the selected block as the haze brightness.

Referring back to FIG. 1, the image down-scaler 120 scales the hazy image down into a predetermined size. For example, the image down-scaler 120 scales an input image down into an image having a size of 320×240. Considering a large amount of computation with such a large size of input video as is, it initially undergoes the down scaling process.

The blockwise transmission estimator 130 partitions an image down-scaled by the image down-scaler 120 into a predetermined number of blocks, obtains a contrast per block, an image loss per block, and a time loss per block, and estimates a blockwise transmission by using a final cost function calculated by the contrast, image loss and time loss.

Referring to FIG. 3, the blockwise transmission estimator 130 includes an image partitioning module 132, a cost function calculating module 134, a final cost function calculating module 136 and a blockwise transmission detecting module 138. All or some components of the blockwise transmission estimator 130, such as the image partitioning module 132, the cost function calculating module 134, the final cost function calculating module 136 and the blockwise transmission detecting module 138 are implemented by one or more processors and/or application-specific integrated circuits (ASICs).

The image partitioning module 132 partitions the hazy image down-scaled by the image down-scaler 120 into a predetermined number of blocks. If the size of each block is too small, it is difficult for the image partitioning module 132 to estimate a transmission. For this reason, the minimum size of each block is set to 16×16 or more. However, the number of the blocks can variously determined based on the predetermined number, or in consideration of system conditions. Image partitioning performed by the image partitioning module 132 is to compensate for a haze component in consideration of the influence by nonuniform haze. The number of the blocks based on image partitioning are properly determined in consideration of hardware complexity.

Equation 1 is used to reconstruct an image. Mere information on the haze brightness value obtained by the haze brightness measurer 10 leaves an underdetermined problem where the equation is overdominated by unknown quantities in calculating transmission $t_p$ and original brightness value $J_p$ for each pixel. On the assumption that transmission $t_p$ in the block is uniform, therefore, the number of the unknown quantities are greatly reduced to B+1 for B (the number of pixels in the block) equations. The image is partitioned in consideration of local depth information because the whole undivided image assumed to have a single uniform transmission 't' precludes an adaptive compensation for image deterioration according to image depth information.

The cost function calculating module 134 performs blockwise calculations of a contrast, an image loss, and a time loss while changing a predetermined range of transmissions by a predetermined rate.

To calculate transmission 't', the following conditions need to be satisfied: (1) the output image contrast determined based on transmission 't' to be large, (2) the output image loss determined based on transmission 't' to be minimum, and (3) to reduce the flickering phenomenon with a video, the difference from the previous frame to be small.

Consequently, the cost function calculating module 134 generates a cost function taking account of cost $E_C$ considering a contrast, image loss $E_L$ which is incurred when improving the contrast, and cost $E_T$ taking account of temporal similarity in a video and calculates a contrast, an image loss and a time loss by using each cost function.

To this end, the cost function calculating module 134 includes a contrast calculating module 134a, an image loss calculating module 134b and a time loss calculating module 134c.

The contrast calculating module 134a calculates a contrast $E_C$ by using dispersion $\delta^2$ based on a brightness value of each pixel as represented by Equation 2.

$$E_C = -\sigma^2 = \sum_{p=1}^{N} \frac{(J_p - \bar{J})^2}{N} \qquad \text{Equation 2}$$

Here, N is the number of pixels, $J_p$ is the brightness of an original object, p is the position of each pixel, and $\bar{J}$ is the average brightness of the original object.

Equation 2 uses RMS (root mean square) contrast generally used to calculate a contrast in an image. In the RMS contrast, the contrast is measured by using a dispersion value of the image.

In addition, for the sake of the desired large contrast of the output image determined by transmission 't', cost functions as Equation 2 are generated, and for the purpose of finding transmission 't' by which its cost function is generated to have the least (optimized) value and based on the fact that the RMS contrast increases the value of contrast as it improves, minus (−) symbol is added to the cost function such that the cost function is decreased as the transmission is decreased.

In other words, the contrast calculating module 134a carries out a blockwise multiplication by −1 of dispersion generated by using a brightness value of each pixel to calculate a contrast. Equation 2 is referred to as a first cost function (or a contrast improving cost function). The first cost function is a function for finding a transmission by which a contrast of a reconstructed image is maximized. A blockwise transmission maximizing the contrast always converges on '0'. As the blockwise transmission converges on '0', an input pixel value-to-output pixel value is determined to be exceeding a pixel value [0 255] that can be expressed by a computer.

When the blockwise transmission converges on '0', output pixel values less than '0' or greater than '255' are present as an image loss which needs to be minimized. The image loss refers to an amount obtained when output pixel values less than '0' or greater than '255' are rounded off to 0 and 255.

In order to minimize the image loss, therefore, the image loss calculating module 134b calculates an image loss per block by using a second cost function according to Equation 3.

$$E_L = \sum_{p<0} \frac{(0 - J_p)^2}{N} + \sum_{p>255} \frac{(J_p - 255)^2}{N} \qquad \text{Equation 3}$$

When graphically expressing the concept of Equation 3, FIG. 4 shows the corresponding area of region A. Referring to FIG. 4, region A corresponds to pixel values less than '0' or greater than '255', i.e. an image loss.

In addition, in a video, the blockwise transmission has its value changed according to the movement of an object. In order to calculate the blockwise transmission, therefore, it is necessary to calculate a time loss which minimizes temporal difference in an image.

The time loss calculating module 134c calculates a time loss for minimizing a temporal difference in an image by using a third cost function according to Equation 4.

$$E_T = (t^f - \overline{k^f}\, t^{f-1})^2 \qquad \text{Equation 4}$$

In equation 4, $t^f$ is a transmission of the current frame, $t^{f-1}$ is a transmission of the previous frame, and $k^{-f}$ is a blockwise correction coefficient for correcting a transmission according to the movement of an object.

Components of Equation 4 by which the time loss calculating module 134c calculates the time loss will be described. Here, the transmission changes according to the movement of an object.

When an object moves toward an observer, the time loss calculating module 134c finds that the transmission increases. On the other hand, when the object moves away from the observer, the transmission decreases. If the concentration of haze is uniform overall, the amount of the haze changes depending upon the distance between the object and the observer. With a close distance between the object and the observer, the haze affects the image little. With a greater distance, the haze has a substantial influence. In the same manner, when the object moves toward the observer, the influence of the haze is weak. On the other hand, when the object moves away from the observer, influence of the haze is strong. However, reconstructed original brightness of the object is always uniform irrespective of the movement of the object. For the same object, therefore, reconstructed brightness between adjacent frames is expressed by Equation 5.

$$J_p^{f-1} = J_p^f \qquad \text{Equation 5}$$

The change of the transmission according to the movement of the object is calculated by Equation 6.

$$t_p^f = k_p^f t_p^{f-1} \qquad \text{Equation 6}$$

Here, $k_p^f$ is a coefficient for correcting the transmission according to the movement of the object, which is calculated by using Equation 7.

$$k_p^f = \frac{I_p^f - A}{I_p^{f-1} - A} \qquad \text{Equation 7}$$

Here, $I_p^f$ is the brightness of pixel p in frame f, $I_p^{f-1}$ is brightness of pixel p in frame f−1, and A is haze brightness.

Equation 7 is obtained by incorporating Equation 1 into Equation 5 with all terms excluding 't' used after being collectively denoted by kappa.

The same pixel positions of frame f and frame f−1 do not always express the same object, which is due to movement of the object. In order to compensate for the movement of the object, a probability weight is calculated by using the difference between pixel values at the same positions of frame f and frame f−1. The probability weight $w_p^f$ is calculated by using Equation 8. Equation 8 is an equation made on the assumption that a large difference between the pixel value at position p of frame f−1 and the pixel value at position p of frame f (co-located in different frames) represents a low probability of two objects being the same and that a small difference between the co-located pixel values represents a high probability of two objects being the same with the brightness changed due to the change of transmission 't'.

$$w_p^f = \exp\left(-\frac{(I_p^f - I_p^{f-1})^2}{\delta^2}\right) \quad \text{Equation 8}$$

Here, δ is a standard deviation indicating a probability based on the difference between pixel values, which is generally 10. As $w_p^f$ increases, $I_p^{f-1}$ and $I_p^f$ have increasing probability to represent the same object. As transmission is calculated in blocks, renewing of Equation 7 in blocks B by using a probability weight will generate a blockwise correction coefficient $\overline{k^f}$ which is expressed by Equation 9.

$$\overline{k^f} = \frac{\sum_{p \in B} w_p^f k_p^f}{\sum_{p \in B} w_p^f} \quad \text{Equation 9}$$

Once the blockwise correction coefficient is calculated through Equation 9, the time loss calculating module 134c calculates a time loss by using Equation 4 generated by using the difference between the transmission of the previous frame and the transmission of the current frame. At this time, the time loss calculating module 134c corrects a transmission $t^{f-1}$ of the previous frame by using the probability weight $\overline{k^f}$ for taking account of the change of the transmission due to the movement of the object.

The final cost function calculating module 136 calculates a final cost function value based on the contrast, the image loss, and the time loss which are obtained by the cost function calculating module 134.

To calculate transmission 't', the following conditions need to be satisfied: (1) the output image contrast determined based on transmission 't' to be large, (2) the output image loss determined based on transmission 't' to be minimum, and (3) to reduce the flickering phenomenon with a video, the difference from the previous frame to be small. In search of a transmission that satisfies the above three conditions, the three conditions need to be transformed into a cost function to find a transmission for generating the least cost function. In other words, when the cost function comes to have the least value, it can be considered that a contrast of an output image is large, an image loss is small, and a video flickering is minimal.

Therefore, a final cost function needs to include all of the three conditions. So, when the blockwise transmission is calculated, an all-inclusive final cost function such as Equation 10 is generated for use in calculating the final cost function value.

$$E = E_C + \lambda_L E_L + \lambda_T E_T \quad \text{Equation 10}$$

Here, E is a final cost function value, $E_C$ is a contrast value, $E_L$ is an image loss, $E_T$ is a time loss, $\lambda_L$ is an image loss coefficient, and $\lambda_T$ is a time loss coefficient.

The blockwise transmission detecting module 138 detects a transmission for generating a least final cost function from the final cost function values calculated by the final cost function calculating module 136 as a blockwise transmission. In particular, the blockwise transmission is one of values ranging from 0 to 1. Consequently, the blockwise transmission detecting module 138 calculates a final cost function value while changing values (numbers) from 0 to 1 as the blockwise transmission and detects a transmission for generating a least final cost function from the calculated final cost function values as the blockwise transmission. The values (numbers) from 0 to 1 includes 0.1, 0.2 and so on. The values are changed at any intervals or rates.

Referring back to FIG. 1, the first pixelwise transmission estimator 140 applies the blockwise transmission detected by the blockwise transmission estimator 130 to an edge-preserving filter to convert the blockwise transmission into a first pixelwise transmission. The edge-preserving filter generates pixelwise approximate transmissions by using pixel values of an input image.

The first pixelwise transmission estimator 140 calculates a pixelwise approximate transmission by using Equation 11.

$$\hat{t}_p = aI_p + b \quad \text{Equation 11}$$

Here, z,31 is a pixelwise approximate transmission, $I_p$ is brightness captured by a camera, and a and b are variables of a linear function calculated by applying the edge-preserving filter.

An input image has a value of between 0 and 255 while t has a value of between 0 and 1. Therefore, Equation 11 is to express 't' with an input image by scaling down the value of between 0 and 255 to 0~1 through the variables a and b and by approximating the size (the average value).

The first pixelwise transmission estimator 140 calculates such variables a and b that generate the least difference between the blockwise transmission and the approximate transmission to obtain a pixelwise transmission.

At this time, for the purpose of more rapid calculation with a video, the variables a and b are calculated by using a window of size W and, after a shift by W/2, the variables a and b are calculated. In an overlapped region, the variables a and b are averaged. In the length of shift W/2, 2 is replaced by various numbers.

Referring to FIG. 5, the first pixelwise transmission estimator 140 includes an approximate transmission calculating module 142, a variable calculating module 144 and a pixelwise transmission detecting module 146.

The approximate transmission calculating module 142 calculates an approximate transmission per block by partially overlapping blocks and applying a Gaussian weight to each block.

In order to meet both of pixelwise processing accuracy and blockwise processing calculation complexity, the approximate transmission calculating module 142 simultaneously addresses the increase of calculation speed and algorithm accuracy by partially overlapping the blocks. Partial block overlapping is a universal method used in local histogram equalization. As shown in FIG. 6 at (a) and (b), more overlapped range involves more blocks to be used for averaging, which provides the result close to that of the pixelwise operation. Particularly, FIG. 6 (a) shows blocks overlapped by ½ and FIG. 6 (b) shows blocks overlapped by ¼. As can be seen from FIGS. 6 (a) and (b), the larger the overlapped range becomes, the more blocks used for the averaging operation and, therefore, the result close to that of the pixelwise operation can be obtained.

However, since a calculation speed is also increased as the overlapped range is increased, n, since the partial block overlapping is not the pixelwise overlapping, a blocking effect occurs at the boundaries of the blocks and block deterioration the blocking gets worse as the number of times of overlapping is reduced.

Consequently, the approximate transmission calculating module 142 applies a Gaussian weight as shown in FIG. 7 to each block to minimize blocking effect. The Gaussian weight is individually applied to each overlapped block. Using the Gaussian weight can reduce a blurring phenomenon at the boundaries of the blocks.

Then, the approximate transmission calculating module 142 calculates an approximate transmission of a specific pixel by using an equation of {(blockwise approximate transmission value of first block×Gaussian weight)+(blockwise approximate transmission value of second block×Gaussian weight)}. This is obtained by from the principle that a transmission is proportional to pixel brightness.

The variable calculating module 144 calculates a variable for generating the least difference between the blockwise transmission and the approximate transmission. The variable is a and b in Equation 11. Equation 12 is defined as follows to minimize the difference between the blockwise transmission and the approximate transmission.

$$\Sigma_{p \in B}(t_p - \hat{t}_p)^2 \qquad \text{Equation 12}$$

Here, p is a pixel position and B is a block.

In order to find variables a and b for generating Equation 12 to have the lowest value, the variable calculating module 144 uses a least square method used in linear algebra. Therefore, the variable calculating module 144 calculates variables a and b by using the least square method.

The pixelwise transmission detecting module 146 detects the approximate transmission based on the variable calculated by the variable calculating module 144 as a first pixelwise transmission.

Data of an image changes by every pixel. However, as the calculated transmission has been calculated in blocks, a blocking effect is exhibited at the boundaries of the blocks due to difference between the blockwise transmission of each of the neighboring blocks. The blocking effect is a phenomenon in which the pixel values differ greatly at the boundaries of the blocks. In order to remove the blocking effect, therefore, the transmission calculated in blocks needs to be converted into a pixelwise transmission.

The pixelwise transmission detecting module 146 detects the approximate transmission based on the variable calculated by the variable calculating module 144 as the first pixelwise transmission.

The image up-scaler 150 in FIG. 1 enlarges the image down-scaled by the image down-scaler 120 back to the magnitude of the original image by using a nearest neighbor interpolation. At this time, the image up-scaler 150 also enlarges the first pixelwise transmission calculated by the first pixelwise transmission estimator 140 to the corresponding magnitude of the original image.

The second pixelwise transmission estimator 160 converts the enlarged first pixelwise transmission into a second pixelwise transmission by subjecting the first pixelwise transmission to an edge-preserving filter. In other words, the second pixelwise transmission estimator 160 calculates an approximate transmission per block by partially overlapping blocks of the enlarged image and applying a Gaussian weight to each block. Subsequently, the second pixelwise transmission estimator 160 calculates a variable for generating the least difference between the first pixelwise transmission and the approximate transmission and detects an approximate transmission based on the calculated variable as a second pixelwise transmission. Although the pixelwise transmission detected by the second pixelwise transmission estimator 160 is herein referred to as a second pixelwise transmission, the second pixelwise transmission is referred to as a pixelwise transmission.

The configuration of the second pixelwise transmission estimator 160 is identical to FIG. 5 and, therefore, a description thereof will be omitted.

The image down-scaler 120, blockwise transmission estimator 130, first pixelwise transmission estimator 140, image up-scaler 150 and second pixelwise transmission estimator 160 are configured as a single component. In this case, the single component is referred to as a transmission estimator.

The image reconstructor 170 removes haze from the image by using the haze brightness measured by the haze brightness measurer 110 and the second pixelwise transmission converted by the second pixelwise transmission estimator 160.

In other words, the image reconstructor 170 generates a dehazed image by using Equation 13.

$$J_p = \frac{I_p - A}{t_p} + A \qquad \text{Equation 13}$$

Here, $I_p$ is brightness captured by a camera, $J_p$ is brightness of an original object, p is the position of each pixel, A is haze brightness, and $t_p$ is a pixelwise transmission.

Equation 13 is derived by arranging Equation 1 for $J_p$.

Figure 8:
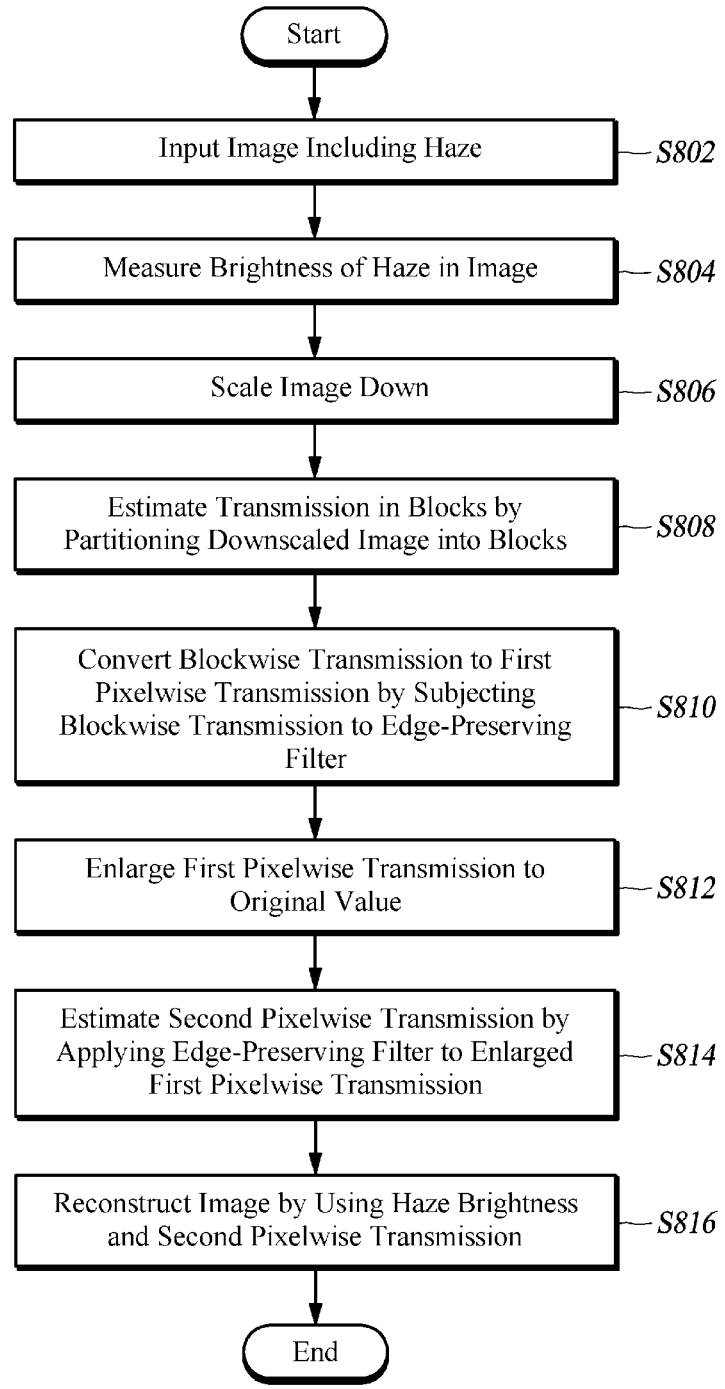
FIG. 8 is a flowchart of reconstructing an image containing haze, performed by an image processing apparatus according to at least one embodiment of the present disclosure.
Figure 9:
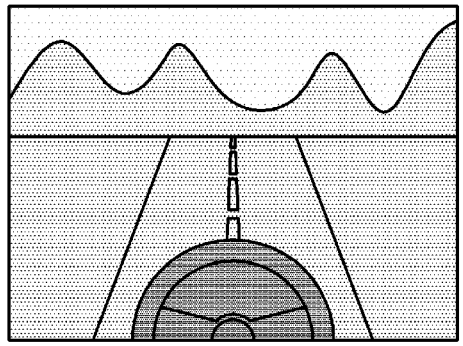
FIG. 9 is a diagram of an example screen with an edge-preserving filter applied based on an overlapped block according to at least one embodiment of the present disclosure.
Figure 9:
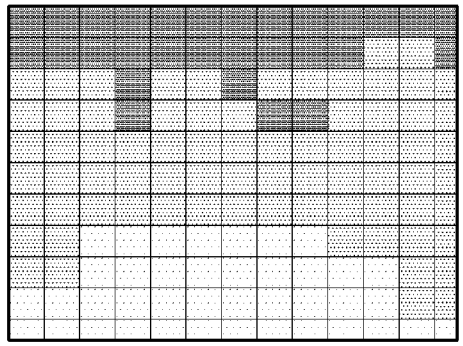
Figure 9:
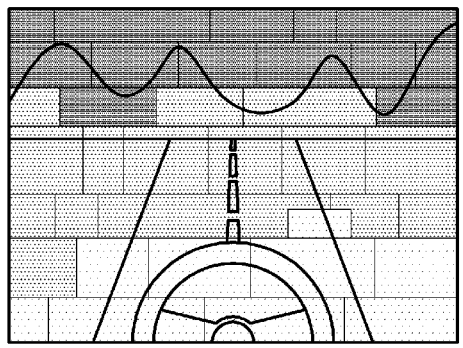
Figure 9:
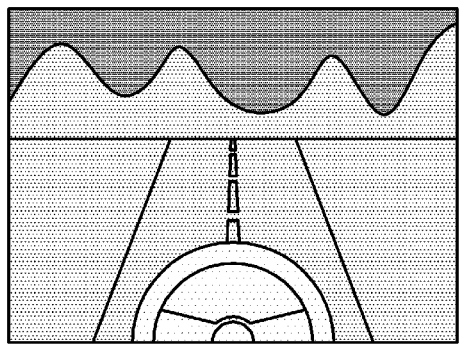

FIG. 8 is a flowchart of reconstructing an image containing haze, performed by an image processing apparatus according to at least one embodiment of the present disclosure, and FIG. 9 is a diagram showing an example of a screen as applied with an edge-preserving filter based on an overlapped block according to at least one embodiment of the present disclosure.

Referring to FIG. 8, when a video containing haze is input to the image processing apparatus (S802), it measures the haze brightness in the video (S804). A method for measuring the haze brightness in the video, performed by the image processing apparatus, will be described in detail with reference to FIG. 10.

Upon completing step S804, the image processing apparatus scales the video containing the haze down to a predetermined size (S806), and estimates a blockwise transmission after partitioning the down-scaled image into blocks of a predetermined size (S808).

A method performed by the image processing apparatus for estimating the blockwise transmission will be described in detail with reference to FIG. 11.

Subsequent to step S808, the image processing apparatus converts the blockwise transmission into a first pixelwise transmission by subjecting the blockwise transmission to an edge-preserving filter (S810). A method performed by the image processing apparatus for estimating the first pixelwise transmission will be described in detail with reference to FIG. 12.

Subsequent to step S810, the image processing apparatus enlarges the first pixelwise transmission and the down-scaled image to corresponding magnitudes of an original image (S812). At this time, the image processing apparatus enlarges the image to the size of the original image by using the nearest neighbor interpolation.

Subsequent to step S812, the image processing apparatus subjects the first pixelwise transmission, which has been enlarged to the magnitude of the original image, to the edge-preserving filter to estimate a second pixelwise transmission (S814). A method for estimating the second pixelwise transmission will be described in detail with reference to FIG. 12.

Subsequent to step S814, the image processing apparatus reconstructs the enlarged image by using Equation 13 generated with the haze brightness and the second pixelwise transmission (S816).

The following description addresses a case of the image processing apparatus applying an edge-preserving filter to a video containing haze with reference to FIG. 9.

Referring to FIG. 9, when a video containing haze as shown in FIG. 9 (a) is applied with a blockwise transmission, the resultant image obtained is as shown in FIG. 9 (b). A blockwise edge filter is applied to the image of FIG. 9 (b) to obtain an image as shown in FIG. 9 (c). A Gaussian weight is applied to the image of FIG. 9 (c) to obtain an image as shown in FIG. 9 (d) with reduced blocking effect at the boundaries thereof.

Figure 10:
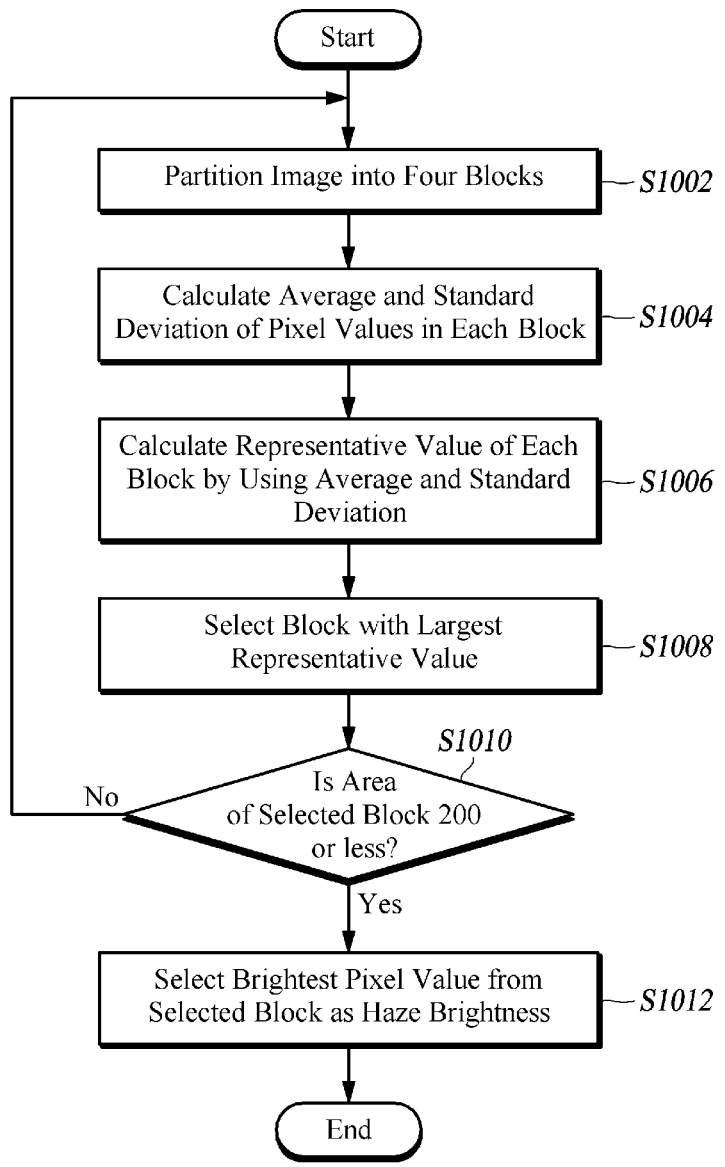
FIG. 10 is a flowchart of measuring haze brightness, performed by an image processing apparatus according to at least one embodiment of the present disclosure.

FIG. 10 is a flowchart of measuring haze brightness, performed by an image processing apparatus according to at least one embodiment of the present disclosure.

Referring to FIG. 10, the image processing apparatus partitions an image containing haze into four blocks (S1002), and calculates the pixel average and standard deviation for each block (S1004).

Then, the image processing apparatus calculates a representative value per block, generated based on the pixel average and standard deviation for each block (S1006).

Subsequently, the image processing apparatus selects one of the blocks having the largest one of the representative values (S1008), and determines whether the area of the selected block is equal to or less than 200 (S1010).

Upon determining in step S1010 that the area of the selected block is equal to or less than 200, the image processing apparatus selects and defines the brightest pixel value from the selected block as haze brightness (S1012).

If step S1010 determines that the area of the selected block is greater than 200, on the other hand, the image processing apparatus performs step S1002.

Figure 11:
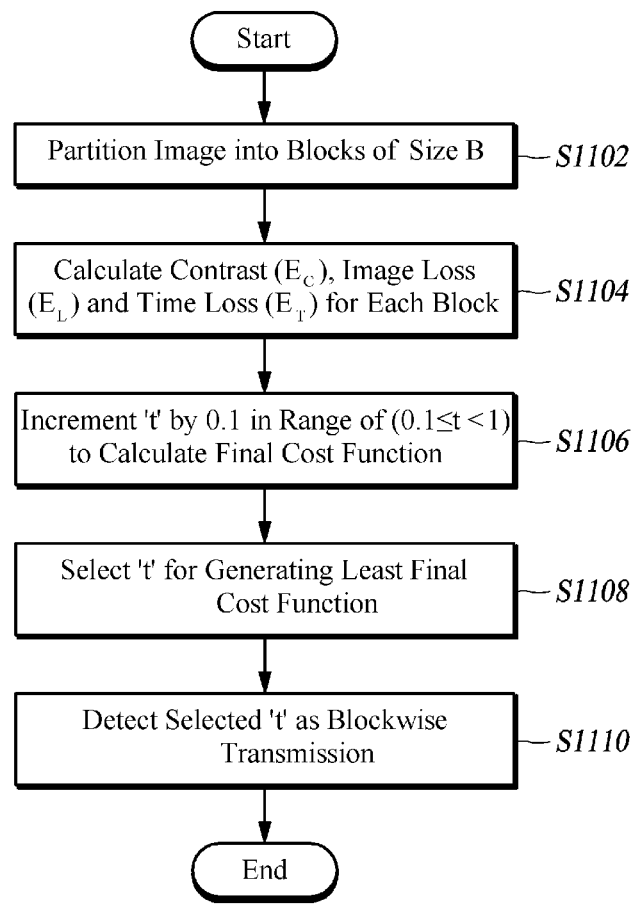
FIG. 11 is a flowchart of detecting a blockwise transmission, performed by an image processing apparatus according to at least one embodiment of the present disclosure.

FIG. 11 is a flowchart of detecting a blockwise transmission, performed by an image processing apparatus according to at least one embodiment of the present disclosure.

Referring to FIG. 11, the image processing apparatus partitions an image containing haze into blocks of size B (S1102).

Subsequent to step S1102, the image processing apparatus calculates a contrast, an image loss and a time loss for each block while changing a predetermined range of transmissions by a predetermined rate (S1104). The method performed by the image processing apparatus for calculating the contrast, the image loss and the time loss has been described above in detail with reference to FIG. 3.

Subsequent to step S1104, the image processing apparatus calculates a final cost function value per block based on the contrast, the image loss and the time loss (S1106), and selects a transmission for generating a least final cost function from the calculated final cost function values (S1108).

Then, the image processing apparatus detects the selected transmission as a blockwise transmission (S1110).

Figure 12:
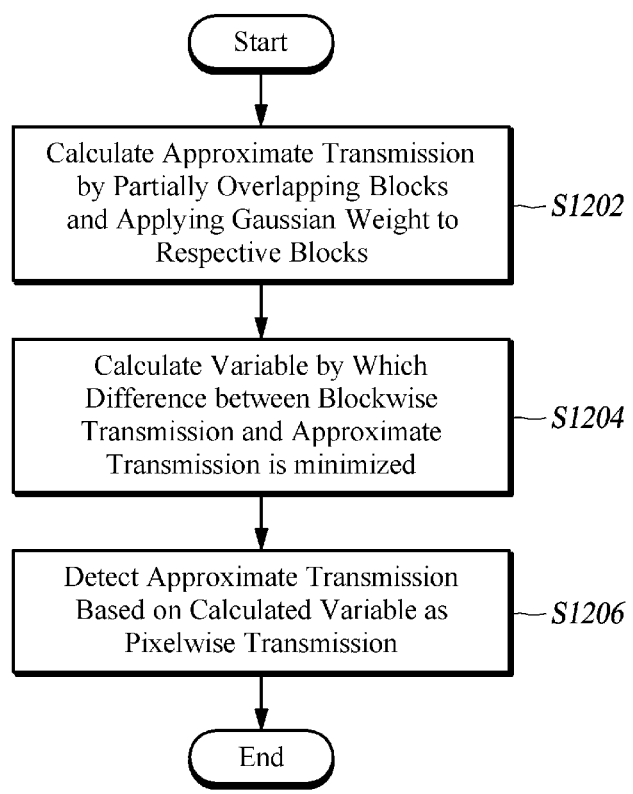
FIG. 12 is a flowchart of estimating a pixelwise transmission, performed by an image processing apparatus according to at least one embodiment of the present disclosure.

FIG. 12 is a flowchart of estimating a pixelwise transmission, performed by an image processing apparatus according to at least one embodiment of the present disclosure.

Referring to FIG. 12, the image processing apparatus partially overlaps blocks and applies a Gaussian weight to each block to calculate an approximate transmission per block (S1202).

Then, the image processing apparatus calculates a variable value for generating the least difference between a previously calculated blockwise transmission and the approximate transmission (S1204).

The image processing apparatus detects the approximate transmission based on the calculated variable value as a first pixelwise transmission (S1206).

According to some embodiments of the present disclosure as described above, a haze component of a video is effectively estimated and removed from the video, thereby improving the image quality. In addition, a contrast through some embodiments of the present disclosure can differently improved based on depth information of an image. In addition, a concentration of haze per pixel in some embodiments of the present disclosure is estimated through calculation of a transmission and the haze may be differently removed per pixel, thereby effectively removing the haze from an image irrespective of how the haze is distributed in the image.

In addition, in some embodiments of the present disclosure a flickering phenomenon which occurs after removal of haze from a video can be removed, thereby more stably removing the haze, which can be processed real-time through introduction of a high-speed filter.

Some embodiments of the present disclosure are used to improve a contrast of an image in various fields, such as flight, airport management, transportation, marine transportation, underwater surveillance, medical imaging (removal of a haze component generated by gas in the body, etc.), agricultural surveillance and video surveillance cameras.

Removal of the haze from the video is implemented as a program. Codes or code segments constituting such a program can be easily occurred to a person skilled in the art. Some embodiments as described above are implemented in the form of one or more program commands that are read and executed by a variety of computer systems and be recorded in any non-transitory, computer-readable recording medium. The non-transitory computer-readable recording medium includes a program command, a data file, a data structure, etc. alone or in combination. The program commands written to the medium are designed or configured especially for the at least one embodiment, or known to those skilled in computer software. Examples of the non-transitory computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the essential characteristics of the disclosure. That is, it is understood that the present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the embodiments explicitly described above but by the claims and equivalents thereof.

What is claimed is:

1. An image processing apparatus for removing haze contained in a video, the apparatus comprising:
    a haze brightness measurer configured to measure haze brightness in an image containing haze;
    a transmission estimator configured to
        estimate a blockwise transmission for generating a least final cost function value that is calculated by using a contrast, an image loss and a time loss of the image, and
        estimate a pixelwise transmission based on the estimated blockwise transmission; and
    an image reconstructor configured to reconstruct the image by using the measured haze brightness and the estimated pixelwise transmission.

2. The image processing apparatus of claim 1, wherein the haze brightness measurer comprises:
    an image partitioning module configured to partition the image into a predetermined first number of blocks;
    a representative value computing module configured to
        calculate an average and standard deviation of pixel values per block, and
        calculate a representative value per block by using the calculated average and the calculated standard deviation; and
    a pixel value selecting module configured to
        select a block from the blocks, the selected block having a largest one of the representative values obtained for the respective blocks,
        determine whether the selected block has an area equal to or less than a preset area, and
        select a value of a brightest pixel among pixel values of the selected block as the haze brightness when the area of the selected block is determined to be equal to or less than the preset area.

3. The image processing apparatus of claim 1, wherein the transmission estimator comprises:
    a blockwise transmission estimator configured to
        partition the image into a predetermined second number of blocks, and
        estimate a blockwise transmission by using a final cost function calculated by using a contrast, an image loss and a time loss per block; and
    a first pixelwise transmission estimator configured to estimate a first pixelwise transmission by applying the estimated blockwise transmission to an edge-preserving filter.

4. The image processing apparatus of claim 3, further comprising
    an image down-scaler configured to
        scale the image down to a predetermined size, and
        transmit the down-scaled image to the blockwise transmission estimator.

5. The image processing apparatus of claim 4, further comprising:
    an image up-scaler configured to enlarge the down-scaled image and the first pixelwise transmission to corresponding magnitudes of the image; and
    a second pixelwise transmission estimator configured to estimate a second pixelwise transmission by applying the enlarged first pixelwise transmission to an edge-preserving filter.

6. The image processing apparatus of claim 3, wherein the blockwise transmission estimator comprises:
    an image partitioning module configured to partition the image into the predetermined second number of blocks;
    a cost function calculating module configured to calculate a contrast, an image loss, and a time loss per block while changing a predetermined range of transmissions by a predetermined rate;
    a final cost function calculating module configured to calculate a final cost function value generated by using the contrast, the image loss and the time loss per block; and
    a blockwise transmission detecting module configured to detect a transmission for generating a least final cost function value from calculated final cost function values, as a blockwise transmission.

7. The image processing apparatus of claim 6, wherein the cost function calculating module is configured to multiply a dispersion generated from using a brightness value of each pixel by −1, to obtain a contrast ($E_C$).

8. The image processing apparatus of claim 6, wherein, when the blockwise transmission converges on 0, the cost function calculating module is configured to calculate the image loss by using an area of a region having pixel values less than '0' or greater than 255.

9. The image processing apparatus of claim 6, wherein the cost function calculating module is configured to
    apply a blockwise correction coefficient for correcting a transmission according to movement of an object to a blockwise transmission of a previous frame to correct the blockwise transmission of the previous frame, and
    calculate a time loss for minimizing a temporal difference in the image by using the corrected blockwise transmission of the previous frame and a blockwise transmission of a current frame.

10. The image processing apparatus of claim 6, wherein the final cost function calculating module is configured to
    generate a final cost function comprising the contrast, the image loss and the time loss, and
    calculate a final cost function value while changing any values between 0 and 1 as a transmission.

11. The image processing apparatus of claim 5, wherein the first or second pixelwise transmission estimator comprises:
    an approximate transmission calculating module configured to calculate an approximate transmission per block by partially overlapping the blocks and applying a Gaussian weight to each block;
    a variable calculating module configured to calculate a variable for generating a least difference between the blockwise transmission and the approximate transmission; and a pixelwise transmission detecting module configured to detect the approximate transmission based on calculated variable as the first or second pixelwise transmission.

12. The image processing apparatus of claim 5, wherein the image up-scaler is configured to enlarge the down-scaled image to the corresponding magnitudes of the image.

13. A method performed by an image processing apparatus for removing haze contained in a video and reconstructing the video, the method comprising:
(a) measuring haze brightness in an image containing haze;
(b) estimating a blockwise transmission for generating a least final cost function value that is calculated by using a contrast, an image loss and a time loss of the image and estimating a pixelwise transmission based on the estimated blockwise transmission; and
(c) reconstructing the image by using the measured haze brightness and the estimated pixelwise transmission.

14. The method of claim 13, wherein the (a) measuring of the haze brightness comprises:
partitioning the image into a predetermined first number of blocks;
calculating an average and standard deviation of pixel values for each of partitioned blocks;
calculating a representative value per block by using the calculated average and the calculated standard deviation;
selecting a block from the blocks, the selected block having a largest one of the representative values calculated for the respective blocks;
determining whether the selected block has an area equal to or less than a preset area; and
selecting a value of a brightest pixel among pixel values of the selected block as the haze brightness upon determining that the area of the selected block is equal to or less than the preset area.

15. The method of claim 13, wherein the (b) estimating of the blockwise transmission comprises:
partitioning the image into a predetermined second number of blocks,
estimating a blockwise transmission by using a final cost function calculated by using a contrast, an image loss and a time loss per block; and
estimating a first pixelwise transmission by applying the estimated blockwise transmission to an edge-preserving filter.

16. The method of claim 15, further comprising:
prior to the estimating of the blockwise transmission, down-scaling the image into a predetermined size.

17. The method of claim 16, further comprising, subsequent to the estimating of the first pixelwise transmission:
enlarging the down-scaled image and the first pixelwise transmission to corresponding magnitudes of the image; and
estimating a second pixelwise transmission by applying the enlarged first pixelwise transmission to an edge-preserving filter.

18. The method of claim 15, wherein the estimating of the blockwise transmission comprises:
partitioning the image into a predetermined second number of blocks;
calculating a contrast, the image loss and the time loss per block while changing a predetermined range of transmissions by a predetermined rate;
calculating a final cost function value per block calculated by using the contrast, the image loss, and the time loss per block; and
detecting a transmission for generating a least final cost function value from calculated final cost function values, as a blockwise transmission.

19. The method of claim 15, wherein the estimating of the first pixelwise transmission comprises:
calculating an approximate transmission per block by partially overlapping the blocks and applying a Gaussian weight to each block;
calculating a variable for generating a least difference between the blockwise transmission and the approximate transmission; and
detecting an approximate transmission based on the calculated variable as the first pixelwise transmission.

20. An image processing apparatus for removing haze contained in a video, the apparatus comprising:
a haze brightness measurer configured to measure haze brightness in an image containing haze;
a transmission estimator configured to
estimate a blockwise transmission for generating a least final cost function value that is calculated by using a contrast, an image loss and a time loss of the image, and
estimate a pixelwise transmission based on the estimated blockwise transmission; and
an image reconstructor configured to reconstruct the image by using the measured haze brightness and the estimated pixelwise transmission,
wherein image processing apparatus further comprises:
an image down-scaler configured to
scale the image down to a predetermined size and transmit the down-scaled image to the blockwise transmission estimator,
an image up-scaler configured to enlarge the down-scaled image and the first pixelwise transmission to corresponding magnitudes of the image; and
a second pixelwise transmission estimator configured to estimate a second pixelwise transmission by applying the enlarged first pixelwise transmission to an edge-preserving filter, and
wherein the haze brightness measurer comprises:
an image partitioning module configured to partition the image into a predetermined first number of blocks;
a representative value computing module configured to
calculate an average and standard deviation of pixel values per block, and
calculate a representative value per block by using the calculated average and the calculated standard deviation; and
a pixel value selecting module configured to
select a block from the blocks, the selected block having a largest one of the representative values obtained for the respective blocks,
determine whether the selected block has an area equal to or less than a preset area, and
select a value of a brightest pixel among pixel values of the selected block as the haze brightness when the area of the selected block is determined to be equal to or less than the preset area.

* * * * *